US010525968B2

(12) United States Patent
Felsch et al.

(10) Patent No.: US 10,525,968 B2
(45) Date of Patent: Jan. 7, 2020

(54) METHOD FOR CONTROLLING A DRIVE DEVICE OF A HYBRID VEHICLE AND HYBRID VEHICLE

(71) Applicant: VOLKSWAGEN AKTIENGESELLSCHAFT, Wolfsburg (DE)

(72) Inventors: Christian Felsch, Braunschweig (DE); Jörg Rieling, Braunschweig (DE); Michael Zillmer, Sickte (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 27 days.

(21) Appl. No.: 15/769,439

(22) PCT Filed: Nov. 3, 2016

(86) PCT No.: PCT/EP2016/076580
§ 371 (c)(1),
(2) Date: Apr. 19, 2018

(87) PCT Pub. No.: WO2017/084887
PCT Pub. Date: May 26, 2017

(65) Prior Publication Data
US 2018/0319389 A1    Nov. 8, 2018

(51) Int. Cl.
*B60W 20/20*    (2016.01)
*B60W 20/00*    (2016.01)
(Continued)

(52) U.S. Cl.
CPC ............ *B60W 20/20* (2013.01); *B60K 6/442* (2013.01); *B60W 10/06* (2013.01); *B60W 10/08* (2013.01);
(Continued)

(58) Field of Classification Search
CPC ...... B60W 20/20; B60W 20/00; B60W 20/14; G06F 17/00; B60K 6/442; B60K 1/02; B60K 6/02
See application file for complete search history.

(56) References Cited

U.S. PATENT DOCUMENTS

| 7,104,347 | B2 * | 9/2006 | Severinsky | ............ B60H 1/004 |
| | | | | 180/65.23 |
| 2008/0120001 | A1 * | 5/2008 | Heap | ...................... B60K 6/445 |
| | | | | 701/54 |

(Continued)

FOREIGN PATENT DOCUMENTS

| AT | 009 756 U1 | 3/2008 |
| DE | 103 05 180 A1 | 8/2004 |

(Continued)

OTHER PUBLICATIONS

International Search Report of PCT Application No. PCT/EP2016/076580, dated Feb. 10, 2017.

*Primary Examiner* — Yuri Kan
(74) *Attorney, Agent, or Firm* — Pearl Cohen Zedek Latzer Baratz LLP (57) ABSTRACT

In a method for controlling a drive system (3, 203) of a hybrid vehicle (1, 201), a performance-oriented mode or a consumption-oriented mode can be selected for the drive system, whereby, when the consumption-oriented mode is selected, in the case of a first condition, the method involves: controlling the drive system in a parallel boost hybrid mode of operation in which the internal combustion engine (5, 205) and additionally the first electric machine and/or the second electric machine delivers a drive torque until a criterion is met that depends on the duration of the operation and/or on the energy conversion in the parallel boost hybrid mode of operation, and if the criterion is met, changing over to a serial hybrid mode of operation in which the drive (Continued)

torque is delivered by means of the second electric machine (11, 211), and the internal combustion engine (5, 205) powers the first electric machine (9, 209) in order to generate electrical energy.

11 Claims, 6 Drawing Sheets

(51) Int. Cl.
*B60W 20/14* (2016.01)
*B60K 1/02* (2006.01)
*B60K 6/02* (2006.01)
*B60K 6/442* (2007.10)
*B60W 10/06* (2006.01)
*B60W 10/08* (2006.01)
*B60W 50/08* (2012.01)
*B60W 30/182* (2012.01)

(52) U.S. Cl.
CPC ........ *B60W 30/182* (2013.01); *B60W 50/082* (2013.01); *B60W 2540/10* (2013.01); *Y02T 10/56* (2013.01); *Y02T 10/6234* (2013.01); *Y02T 10/6286* (2013.01); *Y02T 10/84* (2013.01)

(56) References Cited

U.S. PATENT DOCUMENTS

| | | | | |
|---|---|---|---|---|
| 2009/0017984 | A1* | 1/2009 | Shibata | B60K 6/445 |
| | | | | 477/3 |
| 2013/0013137 | A1* | 1/2013 | Saint-Macary | B60K 6/442 |
| | | | | 701/22 |
| 2013/0282220 | A1* | 10/2013 | Tachikawa | B60W 10/06 |
| | | | | 701/22 |
| 2016/0236671 | A1* | 8/2016 | Imamura | B60W 20/14 |
| 2018/0141426 | A1* | 5/2018 | Tsukizaki | B60K 6/442 |
| 2018/0147931 | A1* | 5/2018 | Toyota | B60K 6/547 |

FOREIGN PATENT DOCUMENTS

| | | |
|---|---|---|
| DE | 699 22 221 T2 | 3/2006 |
| DE | 10 2007 019 319 A1 | 10/2007 |
| DE | 10 2007 054 368 A1 | 6/2008 |
| DE | 602 23 850 T2 | 11/2008 |
| DE | 10 2009 019 485 A1 | 6/2010 |
| DE | 10 2012 103 292 A1 | 10/2013 |
| DE | 10 2013 001 095 A1 | 7/2014 |
| EP | 1 074 087 B1 | 11/2009 |
| EP | 2 636 567 A1 | 9/2013 |
| EP | 2 733 034 A1 | 5/2014 |
| JP | 2015 178360 A | 10/2015 |

\* cited by examiner

METHOD FOR CONTROLLING A DRIVE DEVICE OF A HYBRID VEHICLE AND HYBRID VEHICLE

CROSS-REFERENCE TO RELATED APPLICATIONS

This application is a National Phase Application of PCT International Application No. PCT/EP2016/076580, International Filing Date Nov. 3, 2016, claiming priority of German Patent Application No. 10 2015 222 691.3, filed Nov. 17, 2015, which is hereby incorporated by reference in its entirety.

FIELD OF THE INVENTION

The present invention relates to a method to control a drive system of a hybrid vehicle and to a hybrid vehicle having a drive system as well as a drive system control unit that is configured to carry out the method.

BACKGROUND OF THE INVENTION

German Preliminary Published Application DE 10 2013 001 095 A1 discloses a method for operating a hybrid drive system, whereby the hybrid drive system has an internal combustion engine that can be operatively connected to a first axle of the motor vehicle, a first electric motor that can likewise be operatively connected to the first axle as well as a second electric motor that can be operatively connected to a second axle of the motor vehicle. The electrical energy used to operate the second electric motor is generated by the first electric motor powered by the internal combustion engine in that the output of the internal combustion engine is increased, or else it is drawn exclusively from a storage device for electrical energy.

European patent specification EP 1 074 087 B1 discloses a method and an apparatus for controlling the internal combustion engine of an electric hybrid vehicle, whereby an electric motor or a motor/generator is installed between the engine and the continuously variable or automatic transmission, and whereby the hybrid vehicle has a battery and associated control elements. In this context, a control means essentially maintains the power output of the internal combustion engine along an ideal operating line as the speed of the engine varies. A second electric motor can also be provided and the torque output of the second electric motor can be varied by means of system controls.

German Preliminary Published Application DE 10 2012 103 292 A1 discloses a method for operating an electric drive train of a vehicle, whereby at least two electric motors, which are each operatively connected to a drive axle, as well as a control unit are provided, whereby the torque desired by the driver for the motor operation or the generator operation is determined, and whereby, at a given driven rotational speed, the requisite total power output of the electric driven train is determined, and whereby the power outputs of the individual electric motors are determined, and whereby the resulting power losses of the individual electric motors are minimized on the basis of stored power loss characteristic maps for the individual electric motors.

German Preliminary Published Application DE 10 2009 019 485 A1 discloses a drive train comprising a first electric motor and a planetary gear train as well as vehicles that have this drive train. The drive train has a first electric machine that can be operated in the motor or generator operating state, and a planetary gear train with a rotational speed changing device, whereby the planetary gear train has a drive side and a driven side, and whereby the first electric machine, when in its motor or generator operating state, interacts with the rotational speed changing device for control purposes so that a transmission ratio is established in the planetary gear train. The transmission ratio of the planetary gear train is influenced by the first electric machine, as a result of which the operating point of the internal combustion engine is also determined. The internal combustion engine is operated close to its optimal degree of efficiency. During a purely electric mode of operation, the second electric machine functions as a motor while the first electric machine is idling or is used as an additional drive. Part of the mechanical energy generated by the internal combustion engine is transformed into electrical energy by the first electric machine and transferred directly to the second electric machine. The second electric machine provides assistance for the accelerations. In the case of a deceleration, the energy storage unit can be charged by recuperating the braking energy.

The translation of European patent specification DE 602 23 850 T2 discloses a method for operating a drive system of a hybrid vehicle, whereby the hybrid vehicle comprises an internal combustion engine, a first electric motor/generator, a planetary gear mechanism and a second electric motor/generator. The ratio between a first torque that is generated by the internal combustion engine on the vehicle axles and a second torque that is generated by the second electric motor on the vehicle axles at each gear position of the transmission is changed from a first ratio, when the internal combustion engine as well as the second electric motor are operating normally, over to a second ratio, when either the internal combustion engine or the second electric motor is faulty.

German Preliminary Published Application DE 10 2007 054 368 A1 discloses a control architecture for the selection of an optimal mode or of an optimal gear and input speed for a hybrid powertrain system comprising an internal combustion engine, a first and a second electric motor and an electromechanical transmission system that is selectively operative in order to transmit torque between these and that is operative in a plurality of fixed gear modes and continuously variable modes. Preferred operating conditions and preferred costs are determined for each permissible operating range state and, on this basis, a preferred operating range state is selected. Cost-structure information that is entered into a strategic manager segment and used in an optimization segment preferably comprises operating costs which are generally determined on the basis of factors related to vehicle drivability, fuel economy, emissions and battery life for the determined torque range. Furthermore, costs are assigned to and associated with fuel and electrical power consumption associated with a specific operating point of the powertrain system for the vehicle. The optimum operating costs can be determined by calculating the total powertrain system loss, comprising a term based on engine power loss driven by fuel economy and exhaust emissions, plus losses in the mechanical system, losses in the electrical system and heat losses.

A hybrid vehicle known from the state of the art can be powered by various drive aggregates of the drive system. Powering the hybrid vehicle with one drive aggregate or the other can be advantageous, for example, in terms of energy consumption, but it can have detrimental consequences for the performance of the hybrid vehicle. Consequently, the state of the art faces difficulties when it comes to choosing which drive aggregate should be used to power the hybrid vehicle in a given driving situation.

SUMMARY OF THE INVENTION

One objective of the present invention is to put forward a method to control a drive system of a hybrid vehicle as well as a hybrid vehicle, whereby problems encountered in the state of the art are diminished, whereby especially the energy consumption is reduced while, at the same time, the driver's wishes are taken into consideration.

This objective is achieved by the subject matters according to the independent claims, that is to say, by a method to control a drive system of a hybrid vehicle as well as by a hybrid vehicle according to the independent claims.

According to an embodiment of the present invention, a method is put forward to control a drive system of a hybrid vehicle that comprises an internal combustion engine, a first electric machine, a second electric machine and a battery, whereby a performance-oriented mode or a consumption-oriented mode can be selected for the drive system, whereby, when the consumption-oriented mode is selected, in the case of a first condition, the method involves:

controlling the drive system in a parallel boost hybrid mode of operation in which the internal combustion engine and additionally the first electric machine and/or the second electric machine deliver a drive torque until a criterion is met that depends on the duration of the operation and/or on the energy conversion in the parallel boost hybrid mode of operation, and if the criterion is met, changing over to a serial hybrid mode of operation in which the drive torque is delivered by means of the second electric machine, and the internal combustion engine powers the first electric machine in order to generate electrical energy, whereby, when the performance-oriented mode is selected, in the case of the first condition, the method involves:

controlling the drive system in the serial hybrid mode of operation without waiting for the criterion to be met, whereby the first condition involves:

increasing the target drive value to an intermediate value that is between a threshold for the internal combustion engine, representing a maximum drive value in a parallel hybrid mode of operation in which exclusively the internal combustion engine delivers a drive torque, and a threshold for the parallel hybrid mode of operation, representing a maximum drive value in the parallel boost hybrid mode of operation.

The method can be implemented with software and/or hardware. In particular, the method can be carried out by means of a drive system control unit and/or an engine control unit that is especially contained in the hybrid vehicle. In particular, the method can be carried out by means of a computer-implemented method. For this purpose, a program code with instructions can be loaded into the memory of an arithmetic/logic processor and then executed by the processor.

The internal combustion engine can be a diesel engine or an Otto engine and can also have a fuel tank from which fuel can be supplied to the combustion chambers of the internal combustion engine. The first electric machine and/or the second electric machine can comprise synchronous machines that can be equipped with permanent magnets (in the rotor). The first electric machine can essentially be operated in the generative mode, in which the first electric machine is powered by the internal combustion engine and generates electrical energy that is supplied to the battery and/or to the second electric machine. The first electric machine can also be employed in the electromotive mode of operation. The second electric machine can essentially be employed in the electromotive mode of operation, whereby the second electric machine draws electrical energy from the battery and/or from the first electric machine and generates a mechanical drive torque. The second electric machine can also be operated in the generative mode.

The drive system can be employed essentially in a purely electric mode of operation, in the parallel hybrid mode of operation or in the serial hybrid mode of operation in order to power the hybrid vehicle.

In the purely electric mode of operation, a drive torque can be generated on the drive wheels of the hybrid vehicle by the second electric machine (and/or by the first electric machine), while the internal combustion engine does not have to contribute to a mechanical drive torque.

In the parallel hybrid mode of operation, exclusively the internal combustion engine can deliver the drive torque, without the first electric machine or the second electric machine contributing to the drive torque. In the parallel boost hybrid mode of operation, particularly the internal combustion engine and the first electric machine can deliver the drive torque, without the second electric machine contributing to this. In the parallel boost hybrid mode of operation, particularly also the internal combustion engine and the second electric machine can deliver the drive torque, without the first electric machine contributing to this. Furthermore, in the parallel boost hybrid mode of operation, especially also the internal combustion engine and the first electric machine as well as the second electric machine can deliver the drive torque.

In the serial hybrid mode of operation, the internal combustion engine can power the first electric machine that generates electrical energy in the generative mode of operation, whereby the electrical energy generated in this manner is supplied to the second electric machine in order to deliver the drive torque.

A driver of the hybrid vehicle can select either the performance-oriented mode or the consumption-oriented mode by using, for instance, a lever, a switch, a touch screen or in some other manner. The performance-oriented mode or the consumption-oriented mode can be selected by the driver, for example, manually or with the foot and/or it can be set on the basis of external secondary conditions or for other reasons in an engine control unit or in a drive system control unit. The performance-oriented mode can also be referred to as the sport mode while the consumption-oriented mode can also be referred to as the eco mode.

When the consumption-oriented mode is selected, the drive system can be operated for a longer period of time (e.g. in more driving situations, under a wider array of conditions) in the parallel hybrid mode of operation and/or in the parallel boost hybrid mode of operation than is the case when the performance-oriented mode is selected. Since the parallel hybrid mode of operation and/or the boost hybrid mode of operation can entail a lower energy demand (under certain secondary conditions, especially until the criterion has been met), energy can thus be saved in the consumption-oriented mode (as compared to the performance-oriented mode). Owing to its two-fold energy conversion, the serial hybrid mode of operation can generally have an energy consumption that is higher than the parallel hybrid mode of operation and also, under certain conditions, higher than the parallel boost hybrid mode of operation. The serial hybrid mode of operation, however, can deliver a higher drive torque and/or a higher drive power than the parallel hybrid mode of operation and/or the boost hybrid mode of operation, thus making a sporty driving style possible.

The threshold for the internal combustion engine can represent, for example, a torque threshold for the internal combustion engine and/or a power threshold for the internal combustion engine. The threshold for the internal combustion engine can depend, for instance, on the driving speed and/or on the rotational speed of the internal combustion engine. For example, the threshold for the internal combustion engine (especially for the most part and/or over a certain range) can rise along with the driving speed and/or the rotational speed of the internal combustion engine. The drive system can be operated in the parallel hybrid mode when the driving speed and/or the rotational speed of the drive wheels is above a threshold for the driving speed and/or a threshold for the rotational speed of the drive wheels and when, at the same time, the target drive value is below the threshold for the internal combustion engine. In the parallel hybrid mode of operation, for instance, exclusively the internal combustion engine can deliver the drive torque and/or the drive power. The parallel hybrid mode of operation can be the most energy-efficient mode of operation of the drive system.

Below the threshold for the driving speed and also when the target drive value is below a threshold for the electric mode of operation, the purely electric mode of operation can be employed in that (practically) exclusively the second electric machine generates the drive torque and/or the drive power and transmits it to the drive wheel and/or to several drive wheels. Irrespective of the driving speed, the purely electric mode of operation can be employed if the target drive value is below another threshold for the electric mode of operation that can be smaller than the threshold for the electric mode of operation.

When the driving speed and/or a rotational speed of the drive wheels is above a threshold for the driving speed and/or a threshold for the rotational speed of the drive wheels and when, at the same time, the target drive value is above the threshold for the parallel hybrid mode of operation, the drive system can be operated in the serial mode in that the internal combustion engine does not contribute (directly via a direct mechanical coupling) to the drive torque and/or to the drive power, but at least the second electric machine (optionally also the first electric machine) does. Moreover, the drive system can be operated in the serial mode when the driving speed and/or a rotational speed of the drive wheels is below a threshold for the driving speed and/or a threshold for the rotational speed of the drive wheels and when, at the same time, the target drive value is above a threshold for the electric mode of operation.

The driver can select the target drive value by the using, for example, a drive lever, especially a gas pedal.

When the performance-oriented mode is selected, the drive system can quickly and reliably provide the target drive value requested by the driver. This enhances the driving comfort and also ensures safe driving; in particular, high rates of acceleration can be attained, something which is necessary in certain traffic situations. When the consumption-oriented mode is selected, the energy consumption can be reduced (as compared to the performance-oriented mode). Therefore, the drive system can meet various requirements.

The criterion can entail that the duration of the operation in the parallel boost hybrid mode exceeds a time threshold and/or that the amount of energy drawn from the battery over the duration of the operation in the parallel boost hybrid mode exceeds an energy threshold. In the parallel boost hybrid mode of operation, a drive torque and/or a drive power is generated at least partially by the first and/or second electric machine which (at least partially) is/are supplied with electrical energy by the battery. The electrical energy in the battery can be charged by operating the first electric machine in the generative mode, when it is being mechanically powered by the internal combustion engine. In this context, the charging of the battery calls for an energy conversion that can be associated with relatively high losses. Therefore, as a rule, it is not favorable from an energy standpoint to power the hybrid vehicle in the parallel boost hybrid mode of operation while (at least partially) utilizing electrical energy from the battery. For this reason, the duration of the operation in the parallel boost hybrid mode can be limited in the consumption-oriented mode. The amount of energy drawn from the battery can be measured and/or simulated. The energy threshold can be set manually or else it can be stored as a fixed value in an engine control unit or in a drive system control unit.

When the target drive value is raised from a value below the threshold for the internal combustion engine to the intermediate value and when the performance-oriented mode has been selected, the control of the drive system can entail changing from the parallel hybrid mode of operation over to the serial hybrid mode of operation without waiting for the criterion to be met. When the vehicle is in the performance-oriented mode and when a change is to be made from a value below the threshold for the internal combustion engine over to the intermediate value, thus raising the target drive value, then it can be quite likely that the target drive value will be further raised (in the near future). For this reason, in many cases, it can be advisable to change over to the serial hybrid mode of operation already at an early point in time so that it is possible to quickly and reliably meet a demand for power or a target drive value that is above the threshold for the parallel hybrid mode of operation.

The intermediate value falls between the threshold for the internal combustion engine, representing a maximum drive value in the parallel hybrid mode of operation, in which exclusively the internal combustion engine delivers a drive torque, and the threshold for the parallel hybrid mode of operation, representing a maximum drive value in the parallel boost hybrid mode of operation.

When the performance-oriented mode is selected, in the case of a second condition, the method can involve the following: controlling the drive system in the serial hybrid mode of operation until another criterion (which can be same as or different from the criterion) is met that depends on the duration and/or on the energy conversion of a simulated operation in the parallel boost hybrid mode and, if the other criterion is met, changing over to the parallel boost hybrid mode of operation. Moreover, when the consumption-oriented mode is selected, in the case of the second condition, the method can involve the following: controlling the drive system in the parallel boost hybrid mode of operation without waiting for the other criterion to be met. In this context, the second condition entails that the target drive value is lowered to the intermediate value. Therefore, the second condition can mean that a drive value that is above the threshold for the parallel hybrid mode of operation is lowered to a value that is below the threshold for the parallel hybrid mode of operation but above the threshold for the internal combustion engine. In such a case, when the performance-oriented mode is selected, the drive system can be operated in the serial hybrid mode of operation for a longer period of time than when the consumption-oriented mode is selected. This can yield a sportier driving style when the performance-oriented mode is selected since, as a rule, the serial hybrid mode of operation can deliver a higher drive torque and/or a higher drive power than with the parallel boost hybrid mode of operation. However, when the consumption-oriented mode is selected then, if the second condition is present, it is possible to change over to the parallel boost hybrid mode of operation, especially directly, that is to say, without any delay. As a result, the energy consumption can be reduced.

The other criterion can entail that the period of time since the target drive value was lowered to the intermediate value exceeds another time threshold and/or that a simulated amount of energy drawn from the battery over the duration of the simulated operation in the parallel boost hybrid mode exceeds another energy threshold.

When the performance-oriented mode is selected and the second condition has been met, the drive system can continue to be operated in the serial hybrid mode (for a certain period of time) and thus, the parallel boost hybrid mode of operation is not (yet) being used during this period of time. The amount of energy that would be drawn from the battery if the drive system were being operated in the parallel boost hybrid mode of operation, however, can be simulated without actually operating the drive system in the parallel boost hybrid mode. Consequently, a suitable different criterion can be defined as to how long the drive system (when the performance-oriented mode is selected) should continue to be operated in the serial hybrid mode.

When the target drive value is lowered from a value above the threshold for the parallel hybrid mode of operation (to the intermediate value), controlling the drive system can involve the following when the consumption-oriented mode is selected: changing from the serial hybrid mode of operation over to the parallel boost hybrid mode of operation without waiting for the other criterion to be met. As a result, energy can be saved since, as a rule, the parallel boost hybrid mode of operation is a more consumption-favorable mode of operation than the serial hybrid mode of operation.

The method can also involve detecting the position of a drive lever (for example, the position of the gas pedal, mechanical detection, electronic detection, detection of the actuation of one or more pushbuttons, detection of the position of a manual lever, detection of a selection made on a touchscreen, etc.). Moreover, when the consumption-oriented mode is selected, the method can involve determining a target drive value on the basis of the position of the drive lever in a first range of the trajectory of the drive lever as a value that is greater than the target drive value determined when the performance-oriented mode is selected. Furthermore, when the consumption-oriented mode is selected, the method can involve determining the target drive value on the basis of the position of the drive lever in a second range of the trajectory of the drive lever as a value that is smaller than the target drive value determined when the performance-oriented mode is selected.

The trajectory of the drive lever can be seen as the setting range for the drive lever within which the drive lever can be positioned. The trajectory of the drive lever and/or the position of the drive lever can be, for instance, a linear trajectory or a curved, especially a circular, trajectory. The trajectory of the drive lever and/or the position of the drive lever can be measured as a unit of length and/or as an angular value. In other embodiments, the position of the drive lever can be determined or defined by actuating discrete switches and/or pushbuttons (e.g. as a function of the number of pushbuttons and/or switches that have been actuated). In conventional methods, the target drive value can be proportional to the position of the drive lever (for instance, a portion or percentage value of the trajectory of the drive lever). According to embodiments of the present invention, a proportionality can also exist between the target drive value and the position of the drive lever, although different proportionality constants can be present in various ranges of a position of the drive lever. In this manner, the mapping between the position of the drive lever and the target drive value can be set in such a way that the energy consumption can be reduced.

When the performance-oriented mode is selected, the method can also involve determining the target drive value on the basis of the position of the drive lever along the trajectory of the drive lever as the product of a total rise and the position of the drive lever along the trajectory of the drive lever. In this manner, when the performance-oriented mode is selected, the response behavior when the position of the drive lever is changed can be accelerated in comparison to the case in the consumption-oriented mode (especially in an intermediate range), thus improving the driving comfort as well as the safety.

When the consumption-oriented mode is selected, the determination of the target drive value can also involve:
  determining the target drive value in an initial range of the trajectory of the drive lever as the product of an initial rise and the position of the drive lever, in an intermediate range of the trajectory of the drive lever as the product of an intermediate rise and the position of the drive lever, and in an end range of the trajectory of the drive lever as the product of an end rise and the position of the drive lever,
whereby the total rise is different from the initial rise, from the end rise and from the intermediate rise. The initial rise and/or the end rise can be greater than the intermediate rise.

Other embodiments can define a non-linear relationship between the target drive value and the position of the drive lever in certain ranges of the trajectory of the drive lever. A finer division of the trajectory of the drive lever into more ranges than the initial range, the intermediate range and the end range is possible.

Another aspect of the present invention puts forward a hybrid vehicle comprising a drive system that has an internal combustion engine, a first electric machine, a second electric machine and a battery, whereby the drive system assists in the selection between a performance-oriented mode and a consumption-oriented mode. The hybrid vehicle also has a drive system control unit which is configured to carry out a method according to one of the preceding embodiments.

BRIEF DESCRIPTION OF THE DRAWINGS

Embodiments of the present invention will be explained now with reference to the accompanying drawings. The invention is not limited to the illustrated or described embodiments.

DETAILED DESCRIPTION OF THE INVENTION

Figure 1:
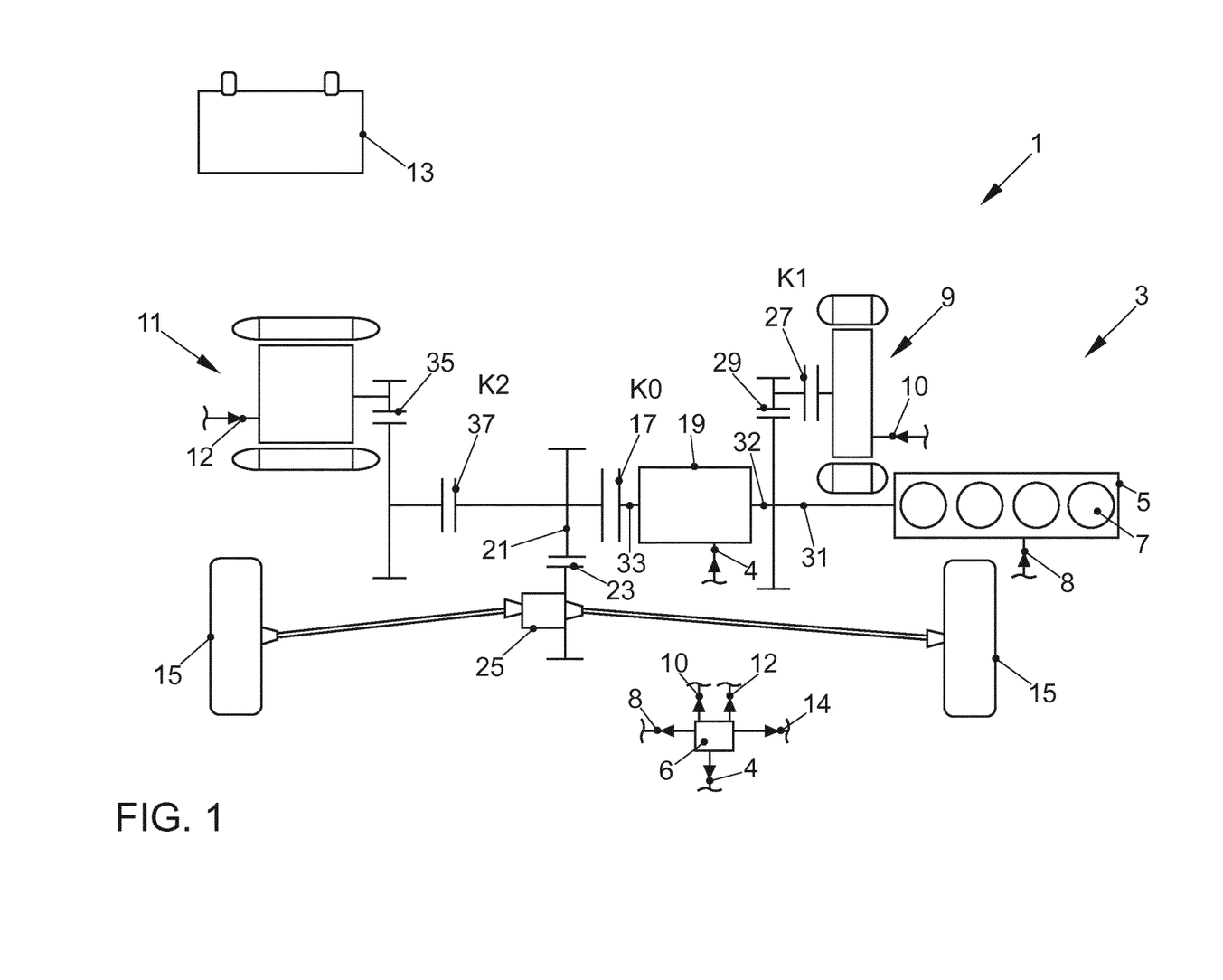
FIG. 1 schematically shows a hybrid vehicle according to an embodiment of the present invention, said vehicle being configured to carry out a method according to an embodiment of the present invention.

The hybrid vehicle 1 schematically shown in FIG. 1 has a drive system 3 as well as a drive system control unit 6 that is configured to carry out a method to control the drive system 3 of the hybrid vehicle 1 according to an embodiment of the present invention. The drive system 3 comprises an internal combustion engine 5 having several cylinders 7, a first electric machine 9 (also referred to as a generator), a second electric machine 11 (also referred to as a traction machine) and a battery 13 that is connected to the first electric machine 9 as well as to the second electric machine 11 via energy supply cables (and power electronics) not shown here.

In order to power the hybrid vehicle 1, the drive system 3 can be operated in three different modes. Firstly, in a purely electric mode of operation in which a drive torque (which is present, for example, on the drive wheels 15) is delivered by means of the second electric machine 11, while the internal combustion engine 5 is switched off (in other words, particularly when no fuel is being supplied from a tank, not shown here). Secondly, the drive system 3 can be operated in a serial hybrid mode in which the drive torque is delivered by means of the second electric machine 11, and the internal combustion engine 5 powers the first electric machine 9 in order to generate electrical energy which, in turn, is supplied to the second electric machine 11 (either directly or via the battery 13). Thirdly, the drive system 3 can be operated in a parallel hybrid mode in which a drive torque is delivered by means of the internal combustion engine 5, and especially the second electric machine 11 and/or the first electric machine 9 is/are switched off.

In the hybrid vehicle 1 shown in FIG. 1, the drive system 3 also comprises a main coupling K0 (17) as well as a gear system 19, both of which are arranged between the internal combustion engine 5 and a wheel drive train 21. The wheel drive train 21 is mechanically connected to the drive wheels 15 via a differential 25 with its associated differential transmission 23. The first electric machine 9 is connected to an output shaft 31 of the internal combustion engine 5 via a first coupling K1 (27) and via a first transmission element 29, whereby the output shaft 31 is mechanically connected to an input shaft 32 of the gear system 19. An output shaft 33 of the gear system 19 is connected to the main coupling K0 (17). The second electric machine 11 is connected to the wheel drive train 21 via a second transmission element 35 and a second coupling K2 (37).

A serial-parallel hybrid concept is implemented in the hybrid vehicle 1. By scaling the battery 13 (also known as an HV battery) in terms of its energy content and/or capacity (charging and discharging rate), the hybrid vehicle 1 can be configured as an HEV (hybrid electric vehicle) and also as a plug-in HEV (PHEV). The first electric machine 9 (also referred to as EM1) is dimensioned, for example, in terms of its power and torque in such a way that, taking into account the transmission ratio of the internal combustion engine 5 relative to the first electric machine 9, every conceivable combustion-engine operating point (also known as the working point) can be set in the serial mode of operation. The second electric machine 11 (also referred to as electric drive motor EM2), for example, is comparable in terms of its power dimensioning to the power dimensioning of the internal combustion engine 5, that is to say, it can deliver a similar maximum power.

For a parallel hybrid mode of operation, the transmission ratios of the internal combustion engine to the drive wheel 15 can be provided in various ways and configurations (e.g. stepped or continuous), whereby here at least one overdrive transmission ratio is provided with, for instance, a typical transmission ratio of, for example, i=2.8, of the internal combustion engine 5 to the drive wheel 15, which means that, when the output shaft 31 of the internal combustion engine 5 rotates 2.8 times, the drive wheel 15 rotates once.

The reduction gears of the drive motor EM2 and of the generator EM1 in the embodiment can be configured, for example, as a spur gear stage or else in the form of a (locked) planetary gear train. The parallel power transmission path (shaft 33) can be uncoupled from the drive wheel 15 by means of the main coupling K0. The drive motor EM2 and the generator EM1 can (optionally) each be uncoupled by means of the second coupling 37 (also referred to as K2) and by means of the first coupling 27 (also referred to as K1) in order to reduce drag losses. All of the couplings K0, K1 and K2 can be configured, for instance, as frictionally engaged multiple plate clutches and/or as positively engaged dog clutches. The generator EM1 can function essentially or exclusively generatively; it can be used to start the internal combustion engine or else, in the parallel hybrid mode of operation, it can be used to provide boost assistance to the internal combustion engine 5. The purely electric mode of operation (EV mode) and the recuperation can be carried out by means of the drive motor EM2 (that is to say, the second electric machine), while the main coupling K0 is open and the second coupling K2 is closed.

Table 1 shown below lists the various modes of operation in which the drive system 3 can be operated, together with the associated coupling states of the main coupling K0, the first coupling K1 and the second coupling K2.

TABLE 1

| Mode of operation | K0 | K1 | K2 |
|---|---|---|---|
| EV mode | open | as desired | closed |
| recuperation | open | as desired | closed |
| serial hybrid operation with and without an increase in the load point | open | closed | closed |
| parallel hybrid operation without an increase in the load point | closed | open | open |
| parallel hybrid operation with an increase in the load point by means of EM1 | closed | closed | open |
| parallel hybrid operation with an increase in the load point by means of EM2 | closed | open | closed |

Therefore, the drive system 3 can be operated in a purely electric mode (EV mode), in a serial hybrid mode and in a parallel hybrid mode. The serial hybrid mode as well as the parallel hybrid mode can each be configured with or without an increase in the load point, as can be seen in Table 1 above.

The direct connection of the second electric machine 11 (EM2) to the drive wheel 15 translates into an efficient electric drive as well as an efficient recuperation.

During the serial hybrid mode of operation, the maximum engine output can be used to power the vehicle, even already at very low vehicle speeds and/or wheel speeds, since in this case, the main coupling K0 is open and consequently, the rotational speed of the internal combustion engine 5 can be set optimally, irrespective of the driving speed. Starting from the purely electric mode (EV mode), a start-up of the internal combustion engine which is very comfortable and which is neutral in terms of the propulsive force can be achieved by means of the first electric machine 9 (generator EM1) when the main coupling K0 is open.

If an additional increase in the load point is needed in the parallel mode of operation, the generative operation needed for this purpose in order to generate electric power to charge the battery can either be performed by the second electric machine 11 (drive motor EM2) or by the first electric machine 9 (generator EM1). In the hybrid vehicle shown in FIG. 1, in the parallel hybrid mode of operation without the need for an additional increase in the load point, the second electric machine 11 (drive motor EM2) and the first electric machine 9 (generator EM1) can be uncoupled by opening the second coupling 37 (K2) and opening the first coupling 27 (K1) in order to minimize drag losses.

In order to minimize fuel consumption, the selection of the purely electric hybrid mode of operation, the serial hybrid mode of operation and the parallel hybrid mode of operation can take into consideration the specific efficiencies or degrees of effectiveness of the drive train components.

Figure 2:
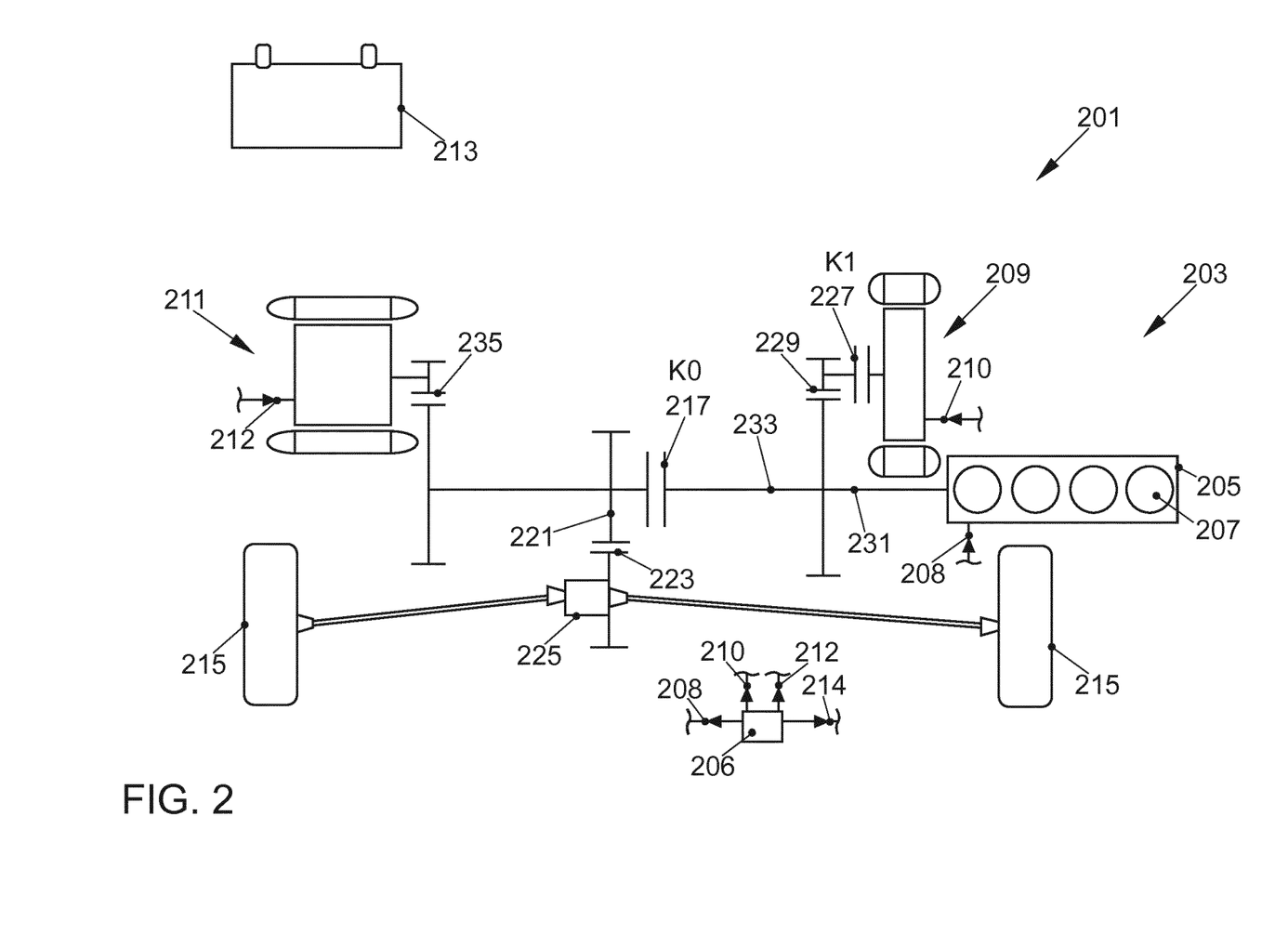
FIG. 2 schematically shows a hybrid vehicle according to another embodiment of the present invention, said vehicle being configured to carry out a method according to an embodiment of the present invention.

FIG. 2 shows a hybrid vehicle 201 according to another embodiment of the present invention, whereby components whose structure and/or function are similar or identical are designated in FIGS. 1 and 2 with reference numerals whose last two digits are the same. For the sake of simplicity, the description below at times indicates the reference numerals from both FIGS. 1 and 2, whereby these reference numerals are separated by a comma.

The hybrid vehicle 201 shown in FIG. 2 can be seen as a "simplified" system topology in which the drive motor EM2 and the generator EM1 cannot be uncoupled from each other and which does not have a gear system (stepped or continuous), so that only one overdrive transmission from the internal combustion engine 205 to the drive wheel 215 can be present.

In the electric mode of operation, the main coupling K0 is open. The internal combustion engine and the electric generator EM1 are standing still (rotational speed=zero). The driving power demand is met by means of the electric drive motor EM2 by correspondingly drawing electric power from the HV battery. The hybrid drive mode of operation can be provided serially or in parallel. In the serial hybrid drive mode of operation, the main coupling K0 is open. The rotational speed of the internal combustion engine can be set as desired. The mechanical power of the internal combustion engine is converted into electric power by means of the generator EM1. This electric power is employed, whenever necessary, to recharge the HV battery as well as by the drive motor EM2 so as to meet the driving power demand.

In the parallel hybrid mode of operation, the main coupling K0 is closed. The rotational speed of the internal combustion engine is coupled to the rotational speed of the wheel via the overdrive transmission. Whenever needed, the mechanical power of the internal combustion engine is used through generative operation of the electric generator EM1 to recharge the HV battery and mechanically transmitted to the wheel directly in order to meet the driving power demand.

In the parallel hybrid mode of operation—without a need for an additional increase in the load point—the generator EM1 can be uncoupled (with dynamic losses that are acceptable to the driver, for instance, in the cruise control and/or adaptive cruise control [ACC] mode) in order to minimize the drag losses. The first coupling 227 can also be absent in yet another embodiment.

The drive system control units 6 and 206 shown in FIGS. 1 and 2 are configured to carry out a method to control a drive system of a hybrid vehicle according to an embodiment of the present invention.

Embodiments of the present invention can be based on a $CO_2$-optimal operation strategy, whereby the drive system 3 or 203 (to the extent possible) is preferably operated in the consumption-oriented mode in the parallel hybrid mode of operation. The hybrid vehicle can have a gear system, as is the case with the hybrid vehicle 1 shown in FIG. 1, but it does not have to have a gear system, as is the case with the hybrid vehicle 201 shown in FIG. 2. The drive system 3 or 203 of the hybrid vehicles 1 or 201 shown in FIGS. 1 and 2 can be essentially powered in three types or modes of operation. Moreover, the drive systems 3 or 203 can be operated in the performance-oriented mode or in the consumption-oriented mode (based on a selection made by the driver).

Figure 3:
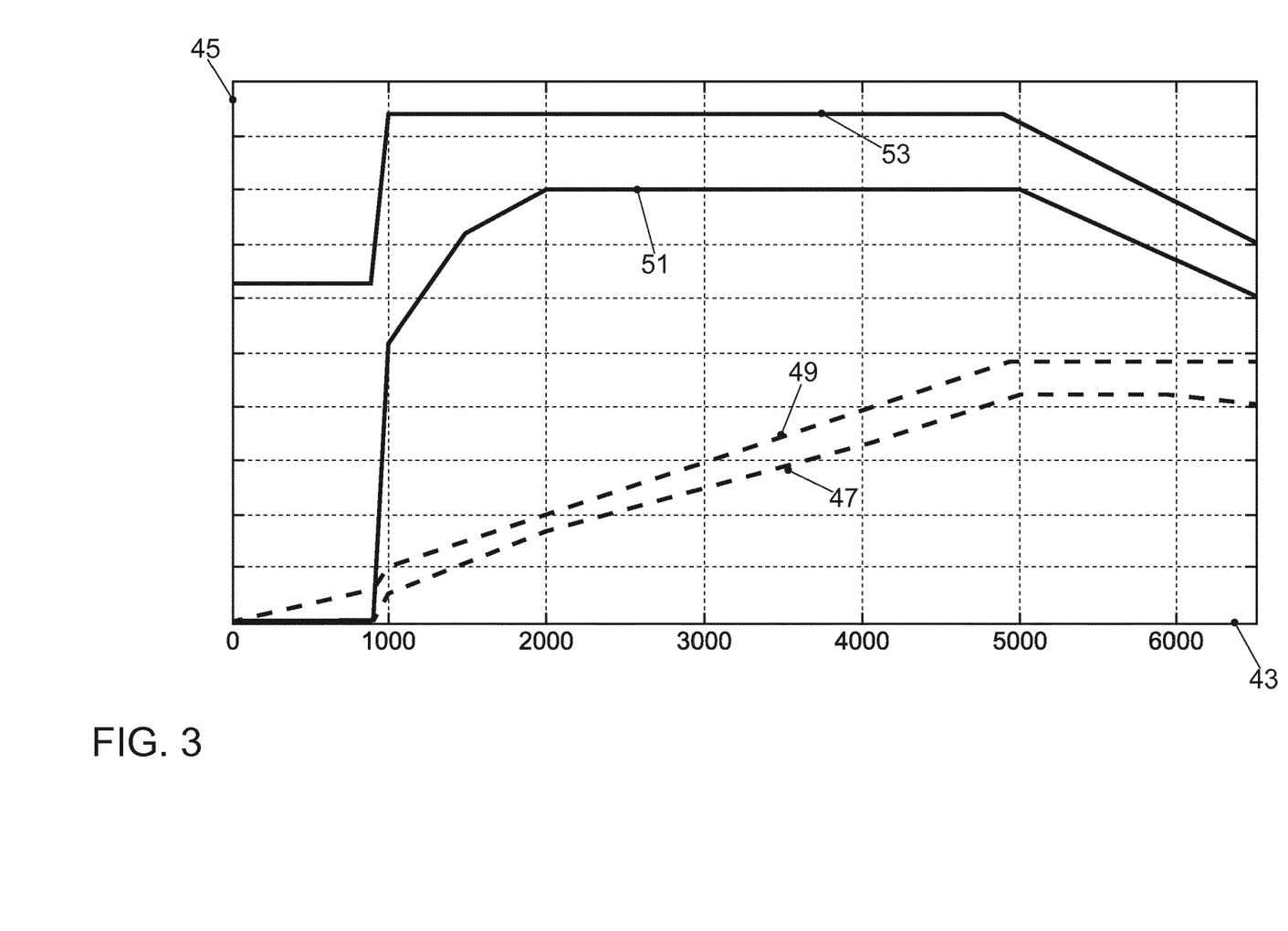
FIG. 3 shows curves of the torque and the power delivered in the parallel hybrid mode of operation by the hybrid vehicles shown in FIG. 1 or 2.

Pertaining to the parallel hybrid mode of operation, FIG. 3 illustrates the power 47 of the internal combustion engine 5, 205, the system power 49, the torque 51 of the internal combustion engine 5, 205 as well as the system torque 53 of the appertaining total drive system 3, 203 by showing a coordinate system having an abscissa 43 that indicates the rotational speed of the internal combustion engine 5, 205 in 1/min and having an ordinate 45 that indicates the power in kW and/or the torque in Nm, said torque being exerted on the input shaft 32 of the gear system 19 or on an output shaft 233. The system power 49 and the system torque 53 are defined taking into account an electric boost assist by the generator EM1 (and/or by the drive motor EM2). Therefore, power and torque demands (that is to say, target powers or target torques) above the full load of the combustion engine can be met in the parallel hybrid mode of operation up to the defined system power 49 and up to the defined system torque 53 by means of a combined engine and electromotive operation with a corresponding drawing of electric power from the battery (HV battery) 13, 213.

The parallel hybrid mode of operation (to the extent possible) can be more efficient than the serial hybrid mode of operation in almost all operating scenarios. The parallel hybrid mode of operation, however, is limited in terms of its power delivery (especially the power delivery to the drive wheels) by a limit of the power and/or torque that can be generated by means of the internal combustion engine and/or by the limit of the system power (internal combustion engine together with the first and/or second electric machine). Consequently, particularly the serial hybrid mode of operation can be considered for the performance-oriented mode (also referred to as the sport mode).

By changing the mode of operation from the parallel hybrid mode of operation over to the serial hybrid mode of operation, a consumption-oriented mode (also referred to as the eco mode) can be changed over to a performance-oriented mode (also known as the sport mode). The maximum achievable torque that can be delivered by the internal combustion engine in the parallel hybrid mode of operation and the maximum system torque or the maximum internal combustion engine power that can be delivered in the parallel hybrid mode of operation as well as the maximum system power can define a hysteresis bandwidth needed for this purpose (for example, an intermediate range 73 shown in FIG. 5), as will be elaborated upon below in greater detail.

Figure 4:
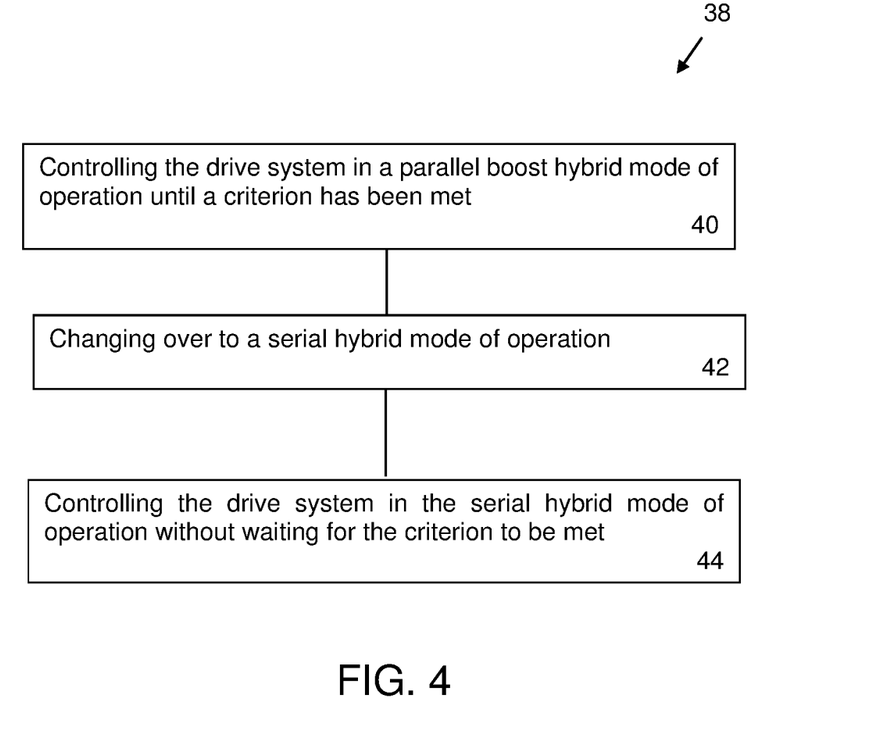
FIG. 4 schematically shows a method to control a drive system of a hybrid vehicle according to an embodiment of the present invention.

FIG. 4 schematically shows a method 38 to control a drive system of a hybrid vehicle (e.g. the hybrid vehicle 1 or 201, which is shown in FIG. 1 or 2) according to an embodiment of the present invention. In this context, the drive system (e.g. the drive system 3 or 203) comprises an internal combustion engine (e.g. 5 or 205), a first electric machine (e.g. 9 or 209), a second electric machine (e.g. 11 or 211) and a battery (e.g. 13 or 213), whereby a performance-oriented mode or a consumption-oriented mode can be selected for the drive system. When the consumption-oriented mode is selected, in the case of a first condition, the method involves method step 40: controlling the drive system in a parallel boost hybrid mode of operation until a criterion has been met that depends on the duration and/or on the energy conversion of the operation in the parallel boost hybrid mode of operation. If the criterion has been met, the method 38 also involves step 42: changing over to a serial hybrid mode of operation in which the drive torque is delivered by means of the second electric machine and the internal combustion engine powers the first electric machine in order to generate electrical energy. When the performance-oriented mode is selected, in the case of the first condition, the method involves step 44: controlling the drive system in the serial hybrid mode of operation without waiting for the criterion to be met. In this manner, steps 40 and 42 can be carried out when the consumption-oriented mode is selected, whereby step 44 can be carried out when the performance-oriented mode is selected.

In this context, the first condition involves increasing the target drive value (that is to say, for example, the torque or the power desired by the driver) to an intermediate value that is between a threshold for the internal combustion engine, representing a maximum drive value in a parallel hybrid mode of operation, in which (especially exclusively) the internal combustion engine delivers the drive torque, and a threshold for the parallel hybrid mode of operation, representing a maximum drive value in the parallel boost hybrid mode of operation, in which the internal combustion engine and additionally the first electric machine and/or the second electric machine deliver the drive torque.

The serial hybrid mode of operation, the parallel hybrid mode of operation and the parallel boost hybrid mode of operation as well as the threshold for the parallel hybrid mode of operation and the threshold for the internal combustion engine will all be explained below by way of an example, making reference to FIG. 5.

Figure 5:
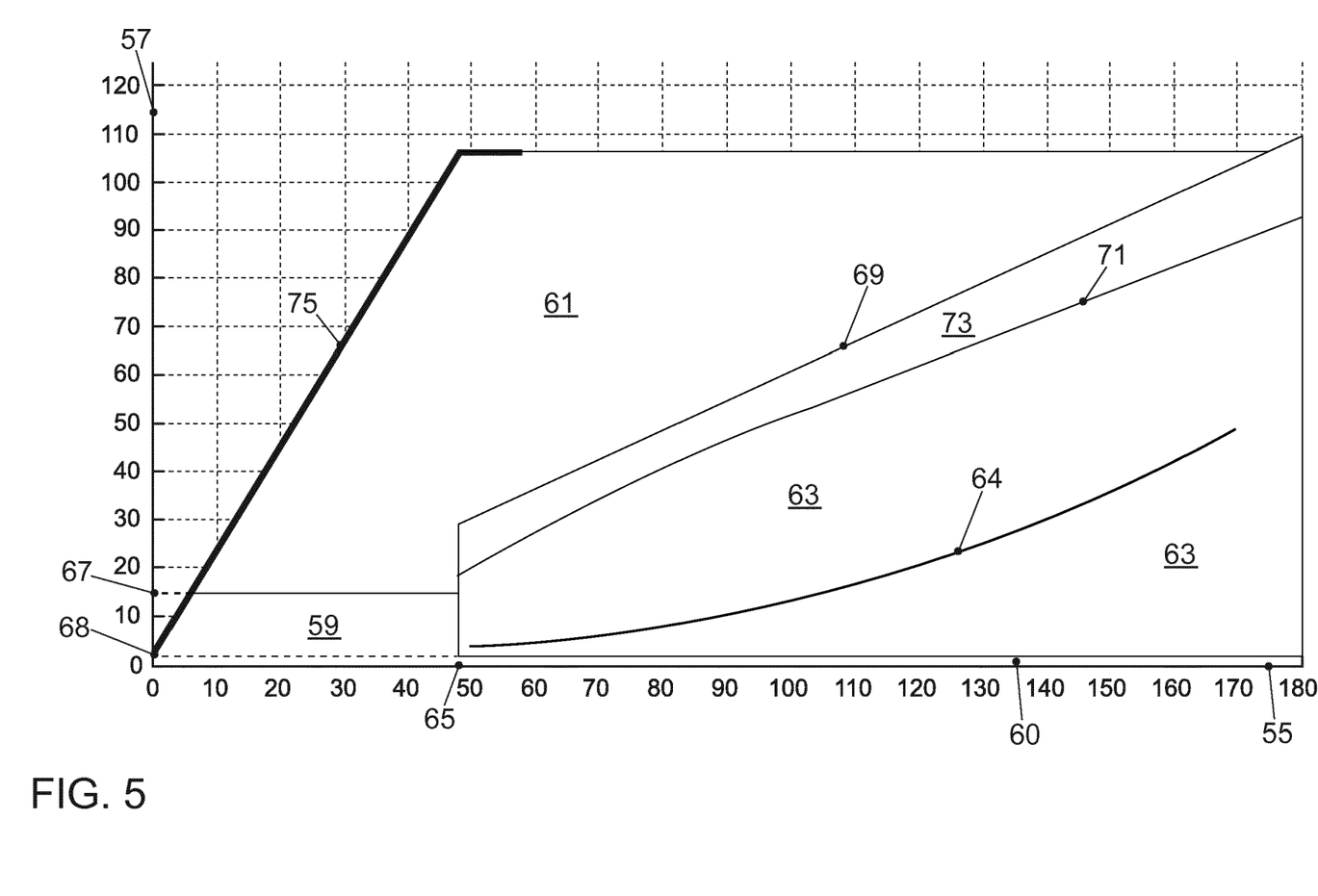
FIG. 5 shows various modes of operation of the hybrid vehicles shown in FIGS. 1 and 2, said modes being employed in a method according to an embodiment of the present invention.

In FIG. 5, the speed of the hybrid vehicle in km/h is plotted on the abscissa 55 and the (available) drive power in kW is plotted on the ordinate 57. The purely electric mode of operation (EV operation) is implemented in a range 59 and in a range 60, while the serial hybrid mode of operation (serial operation) is implemented in a range 61, and the parallel hybrid mode of operation (parallel mode of operation) is implemented in a range 63. The curve 64 represents the driving resistance at a constant driving speed on a flat surface. The diagram shown in FIG. 5 can be plotted analogously as the available drive torque (instead of the drive power) over the vehicle speed or else over the rotational speed of the wheel.

The purely electric mode of operation is implemented in range 59 if the driving speed is below a threshold 65 for the driving speed and if the drive power (target drive power) is below a power threshold 67 for the electric mode of operation.

Moreover, the purely electric mode of operation is implemented in range 60 if the driving speed is above the threshold 65 for the driving speed and if the drive power (target drive power) is below another power threshold 68 for the electric mode of operation that is smaller (e.g. by 3 kW) than the power threshold 67 for the electric mode of operation.

The parallel hybrid mode of operation is implemented in range 63 if the driving speed is above the threshold 65 for the driving speed, the target drive power is below the speed-dependent power threshold 69 for the parallel hybrid mode of operation and also if the target drive power is above the threshold 68 for the electric mode of operation. The power threshold 69 of the parallel hybrid mode of operation is defined here as the sum of the maximum output power 71 of the internal combustion engine 5, 205 and the boost assist of the first electric machine 9, 209 and/or the boost assist of the second electric machine 11, 211. Therefore, in the parallel hybrid mode of operation, a boost is provided in the range 73 by means of the first electric machine EM1 and/or by means of the second electric machine EM2.

The serial hybrid mode of operation is implemented in range 61 if the driving speed is below the threshold 65 for the driving speed and if the target drive power is above the power threshold 67 for the electric mode of operation. Moreover, the serial hybrid mode of operation is implemented in range 61 if the driving speed is above the threshold 65 for the driving speed and if the target drive power is above a speed-dependent power threshold 69 for the parallel hybrid mode of operation.

In order to limit consumption, the maximum drive power delivery of the electric mode of operation is limited (here, for example, to about a 15 kW drive power up to a speed of approximately 49 km/h, and to about a 3 kW drive power above a speed of approximately 49 km/h) by the threshold 67 for the electric mode of operation and by the other threshold 68 for the electric mode of operation.

The parallel hybrid mode of operation is executed as soon as a minimum rotational speed of the internal combustion engine 5, 205 has been exceeded, taking into consideration the transmission ratio of the internal combustion engine 2, 205 to the drive wheel 15, 215. In an embodiment provided by way of an example, the overdrive transmission ratio of the internal combustion engine 2, 205 to the drive wheel 15, 215 is i=2.8, thus yielding a rotational speed of approximately 1200 rpm for the internal combustion engine 5, 205 at a driving speed of approximately 49 km/h. Above this rotational speed, the internal combustion engine is capable of autonomously generating the drive torque or the drive power. The maximum drive power delivery of the parallel hybrid mode of operation is limited by the maximum load of the internal combustion engine and, taking into consideration the electric boost assist that is provided by the generator EM1 and/or by the drive motor EM2 it is limited by the system power (here by the power threshold 71 of the parallel hybrid mode of operation (without boost) or 69 (with boost)).

The serial hybrid mode of operation is implemented above the power threshold 67 of the electric mode of operation and above the power threshold 69 of the parallel hybrid mode of operation. The maximum drive power delivery of the serial hybrid mode of operation is limited by the dimensioning of the second electric machine 11, 211 (driving motor EM2) and indicated by the line 75. The thresholds 67, 68, 69, 71, 65 can be specified so as to be consumption-optimized or $CO_2$-optimized.

A $CO_2$-optimized hybrid operation strategy is derived on the basis of a comparison of the conventional, purely engine-powered drive with an intermittent, electromotive and engine-powered driving operation. In this context, in the case of the hybrid mode of operation (serial and/or parallel), it is necessary to take into consideration not only the recuperation, but also the additional consumption of fuel due to the increase of the load point as well as the energy consumption for the electric-powered driving and the engine starting processes. Electric-powered driving is only permitted for a range that makes sense from an energy standpoint in which the total efficiency is greater than in the case of a purely engine-powered mode of operation, in spite of the multiple, loss-laden energy conversions.

Which mode of operation is implemented also depends on whether the consumption-oriented or the performance-oriented mode is selected. According to embodiments of the present invention, the line 69 in FIG. 5 can represent the threshold for the parallel hybrid mode of operation referred to in the method 38, while the line 71 can represent the threshold for the internal combustion engine referred to in the driving method 38.

A change in the mode of operation from the parallel over to the serial hybrid mode of operation, that is to say, a change in the mode of operation from the range 63 in FIG. 5 over to the range 61 in FIG. 5, can be depicted by a hysteresis bandwidth that is based on the system dimensioning (system power and system torque; see range 73 in FIG. 5).

In the consumption-oriented mode (eco mode), in the parallel hybrid mode of operation, the direct (not delayed) transition to the serial hybrid mode of operation can be made at power demands (and/or torque demands) that are greater than the system full load (that is to say, greater than the threshold 69 for the parallel hybrid mode of operation).

In contrast, in the consumption-oriented mode, the transition to the serial hybrid mode of operation at power demands that are in an intermediate range (range 73 in FIG. 5) and that are greater than the threshold for the internal combustion engine (for example, threshold 71 in FIG. 7) and smaller than the system full load (for instance, smaller than the threshold 69 for the parallel hybrid mode of operation of the parallel boost hybrid mode of operation) can be made with a delay via an energy integral and/or time integral, as is explained below.

1. Energy Integral:
According to embodiments of the present invention, the change over to the serial hybrid mode of operation can be made as soon as the amount of energy drawn from the battery 13 or 213 (via the time-integrated power drawing from the battery) in order to deliver the required systemic torque exceeds a given limit value.

2. Time Integral:
According to another embodiment of the present invention, the change over to the serial hybrid mode of operation can be made as soon as the duration of the systemic power demand, which is greater than the threshold for the internal combustion engine (for instance, the threshold 71 in FIG. 5) and smaller than the system full load (for example, the threshold 69 for the parallel hybrid mode of operation in FIG. 5) exceeds a given limit value.

In addition to the method steps described in method 38 and above and/or the calculation methodology on the basis of an energy integral and/or time integral, in the consumption-oriented mode, the change of the mode from the parallel hybrid mode of operation over to the serial hybrid mode of operation can be further delayed using a drive lever (especially a gas pedal).

Figure 6:
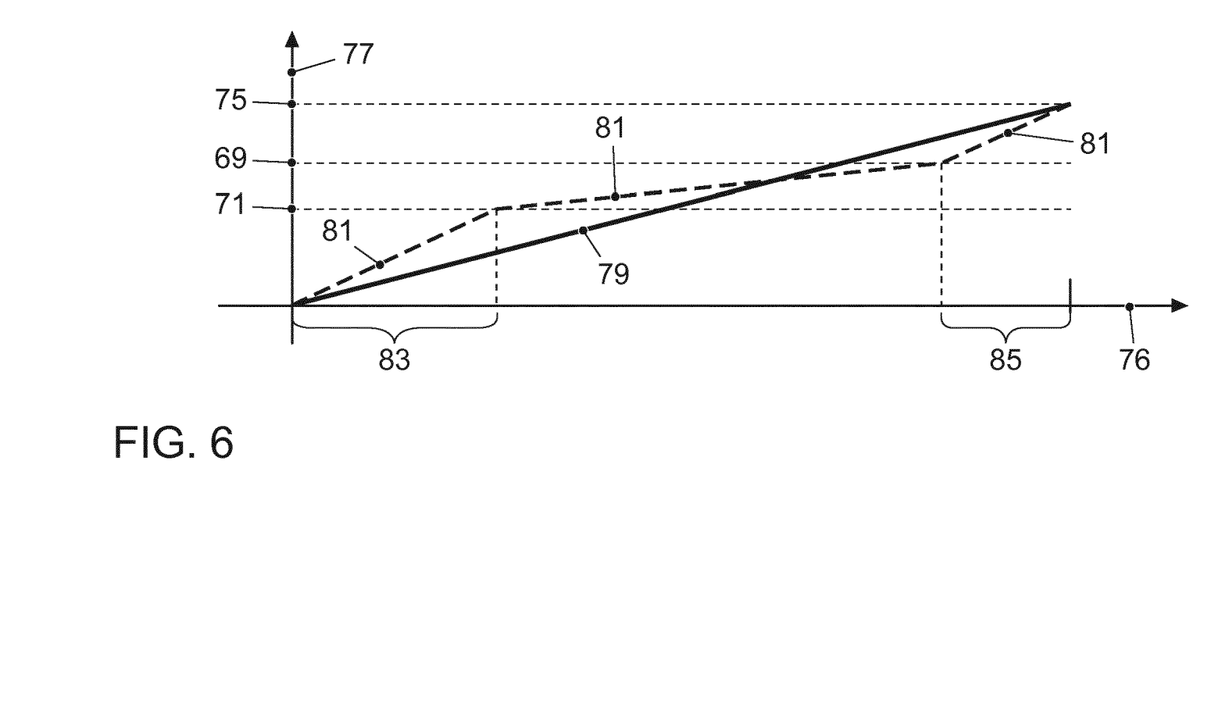
FIG. 6 is a graph showing a method to determine a target drive value as a function of a position of the gas pedal, according to an embodiment of the present invention.

FIG. 6 shows a graph illustrating the dependence of a target drive value (defined by the driver) such as, for example, the target drive power or the target drive torque, as a function of the position of the drive lever, namely, the position of the gas pedal in the concrete case shown in FIG. 6. In this context, the abscissa 76 of the coordinate system shown in FIG. 6 designates the behavior of a position of the gas pedal and a trajectory of the gas pedal, while the ordinate 77 designates a target drive value, especially a target drive power or a target drive torque.

The curve 79 shows the target drive value as a function of the position of the gas pedal for the performance-oriented mode. The curve 81 shows the target drive value as a function of the position of the gas pedal for the consumption-oriented mode of the drive systems 3 or 203 of the hybrid vehicle 1 or 201 shown in FIG. 1 or 2.

Normally, the position of the gas pedal selected by the driver is implemented linearly-proportionally into a corresponding power delivery (target drive value of the hybrid vehicle), as is shown by the curve 79. For a further delayed transition from the parallel to the serial hybrid mode of operation when the consumption-oriented mode is selected, the use of the gas pedal can be adapted accordingly, as is shown by the curve 81. The linear-proportional dependence of the power delivery on the position of the gas pedal can be fundamentally retained in this process. However, the change in the power delivery (target drive value), as a function of a change in the position of the gas pedal for power demands that are greater than the threshold for the internal combustion engine and smaller than the threshold for the parallel hybrid mode of operation is reduced in comparison to the change in the power delivery as a function of a change in the position of the gas pedal for power demands that are smaller than the threshold for the internal combustion engine and greater than the threshold for the parallel hybrid mode of operation. As a result, in the hysteresis bandwidth according to power demands that are greater than the threshold for the internal combustion engine and smaller than the threshold for the parallel hybrid mode of operation (system full load), the driver has to push the gas pedal "further down" in order to increase the power delivery of the vehicle.

Analogously to the reference numeral 71 used in FIG. 5, the reference numeral 71 here designates the threshold for the internal combustion engine, while the reference numeral 69 designates the threshold for the parallel hybrid mode of operation (limit of the system full load) and the reference numeral 75 designates the drive limit in the serial mode of operation.

On the basis of the position of the drive lever when the consumption-oriented mode is selected, the target drive value can be specified in a first range 83 of a trajectory of the drive lever as a value that is greater than a target drive value specified when the performance-oriented mode is selected. On the basis of the position of the drive lever when the consumption-oriented mode is selected, the target drive value can be specified in a second range 85 of a trajectory of the drive lever as a value that is smaller than a target drive value specified when the performance-oriented mode is selected.

In the performance-oriented mode, in contrast, the direct transition to the serial hybrid mode of operation can already be made at power demands that are greater than the threshold for the internal combustion engine.

The change in the mode of operation from the serial over to the parallel hybrid mode of operation (when the target drive value is thus lowered from a value above the threshold for the parallel hybrid mode of operation to an intermediate value) can be implemented analogously to the change from the parallel over to the serial mode of operation. For this purpose, it can be necessary to also take into consideration not only the serial mode of operation in order to meet the driving power demand but also an equivalent parallel hybrid mode of operation in order to meet the driving power demand virtually (especially simulated).

When the vehicle is in the consumption-oriented mode in the serial hybrid mode of operation, the direct transition to the parallel hybrid mode of operation can be made at power demands in the equivalent parallel hybrid mode of operation that are smaller than the threshold for the parallel hybrid mode of operation (system full load).

When the vehicle is in the performance-oriented mode (sport mode) in the serial hybrid mode of operation, the direct transition to the parallel hybrid mode of operation can be made at power demands in the equivalent parallel hybrid mode of operation that are smaller than the threshold for the internal combustion engine (that is to say, full load of the internal combustion engine).

In this performance-oriented mode, the transition to the parallel hybrid mode of operation can be implemented with a delay by means of an energy integral or time integral at power demands that are smaller than the system full load and greater than the internal combustion engine full load (threshold for the internal combustion engine) in the equivalent parallel hybrid mode of operation.

1. Energy Integral

If the amount of energy drawn from the battery (via the time-integrated drawing from the battery) in order to deliver the requisite system power in the equivalent (simulated) parallel hybrid mode of operation exceeds a given limit value, then the change can be made over to the parallel hybrid mode of operation, especially to the parallel hybrid mode of operation.

2. Time Integral

If the duration of the systemic energy demand that is greater than the threshold for the internal combustion engine (that is to say, the full load of the internal combustion engine) and smaller than the system full load (the threshold for the parallel hybrid mode of operation) in the equivalent (simulated) parallel hybrid mode of operation exceeds a given limit value, then the change can be made over to the parallel hybrid mode of operation, especially to the parallel (boost) hybrid mode of operation.

In addition to calculation methodology presented above and based on an energy integral and/or time integral, in the performance-oriented mode, the change of the mode of operation from the serial hybrid mode over to the parallel hybrid mode can also be further delayed by using a drive lever (especially a gas pedal), similarly to the depiction shown in FIG. 6.

According to an embodiment of the present invention, a driver of the hybrid vehicle 1 or 201 can choose between an efficient, consumption-oriented mode (eco mode) and a performance-oriented mode (sport mode), for instance, by means of the position of a selector lever.

In the consumption-oriented mode (eco mode), the parallel-to-serial change of the mode of operation can be implemented so as to be delayed (at least partially), whereas the serial-to-parallel change of the mode of operation can be implemented directly (at least partially). As a result, preference can be given to the efficient parallel hybrid mode of operation whenever possible in order to attain the most efficient consumption possible.

However, in the case of the parallel-to-serial change of the mode of operation, the performance-oriented mode (sport mode) can preferably select the more powerful serial mode of operation (at least partially), and, in the case of the serial-to-parallel change of the mode of operation, it can execute the return to the less powerful parallel hybrid mode of operation with a delay (at least partially). As a result, a performance-oriented selection of the mode of operation can be provided to the greatest extent possible.

LIST OF REFERENCE NUMERALS 1 hybrid vehicle
3 drive system
5 internal combustion engine
6 drive system control unit
7 cylinder
8 control signal
9 first electric machine
10 control signal
11 second electric machine
12 control signal
13 battery
14 control signal
15 drive wheel
17 main coupling K0
19 gear system
21 wheel drive train
23 differential transmission
25 differential
27 first coupling K1
29 transmission element
31 output shaft of the internal combustion engine
32 input shaft of the gear system
33 output shaft of the gear system
35 transmission element
37 second coupling K2
38 method
40 method step
42 method step
44 method step
43 abscissa
45 ordinate
47 internal combustion engine power
49 system power
51 internal combustion engine torque
53 system torque
55 abscissa
57 ordinate
59, 60 ranges of a purely electric mode of operation
61 range of a serial hybrid mode of operation
63 range of a parallel hybrid mode of operation
64 driving resistance at a constant driving speed
65 threshold for the driving speed
67 threshold for the electric mode of operation
68 additional threshold for the electric mode of operation
69 threshold for the parallel hybrid mode of operation
71 maximum output power of the internal combustion engine
73 boost range
75 upper limit for the serial hybrid mode of operation
76 abscissa
77 ordinate
79 curve
81 curve
83 first range of a trajectory of the drive lever
85 second range of a trajectory of the drive lever

The invention claimed is:

1. A method of controlling a drive system of a hybrid vehicle that comprises an internal combustion engine, a first electric machine, a second electric machine and a battery, whereby a performance-oriented mode or a consumption-oriented mode can be selected for the drive system,
   whereby, when the consumption-oriented mode is selected, in the case of a first condition, the method involves:
   controlling the drive system in a parallel boost hybrid mode of operation in which the internal combustion engine and the first electric machine and/or the second electric machine deliver a drive torque until a criterion is met that depends on a duration of an operation of the parallel boost hybrid mode of operation and/or on an energy conversion in the parallel boost hybrid mode of operation, and
   if the criterion is met, changing over to a serial hybrid mode of operation in which the drive torque is delivered by means of the second electric machine, and the internal combustion engine powers the first electric machine in order to generate electrical energy,
   whereby, when the performance-oriented mode is selected, in the case of the first condition, the method involves controlling the drive system in the serial hybrid mode of operation without waiting for the criterion to be met,
   whereby the first condition involves a driver increasing a target drive value to an intermediate value that is between:
   a threshold for the internal combustion engine, representing a maximum drive value in a parallel hybrid mode of operation in which exclusively the internal combustion engine delivers a drive torque, and
   a threshold for the parallel hybrid mode of operation, representing a maximum drive value in the parallel boost hybrid mode of operation.

2. The method according to claim 1, whereby the criterion entails:
   that the duration of the operation in the parallel boost hybrid mode exceeds a time threshold, and/or
   that an amount of energy drawn from the battery over the duration of the operation in the parallel boost hybrid mode exceeds an energy threshold.

3. The method according to claim 1, whereby, when the target drive value is raised from a value below the threshold for the internal combustion engine to a value above the threshold of the internal combustion engine and when the performance-oriented mode is selected, the control of the drive system entails:
   changing from the parallel hybrid mode of operation over to the serial hybrid mode of operation without waiting for the criterion to be met.

4. The method according to claim 1,
   whereby, when the performance-oriented mode is selected, in the case of a second condition, the method involves:
   controlling the drive system in the serial hybrid mode of operation until another criterion is met that depends on the duration and/or on the energy conversion of a simulated operation in the parallel boost hybrid mode, and
   if the other criterion is met, changing over to the parallel boost hybrid mode of operation,
   whereby, when the consumption-oriented mode is selected, in the case of the second condition, the method can involve:
   controlling the drive system in the parallel boost hybrid mode of operation without waiting for the other criterion to be met,
   whereby the second condition entails that the target drive value is lowered to the intermediate value.

5. The method according to claim 1, whereby the other criterion entails:
   that the period of time since the target drive value was lowered to the intermediate value exceeds another time threshold and/or
   that a simulated amount of energy drawn from the battery over the duration of the simulated operation in the parallel boost hybrid mode exceeds another energy threshold.

6. The method according to claim 4, whereby, when the target drive value is raised from a value above the threshold for the parallel hybrid mode of operation to a value below the threshold for the parallel hybrid mode of operation, the control of the drive system when the consumption-oriented mode is selected entails:
   that a change be made from the serial hybrid mode of operation over to the parallel boost hybrid mode of operation without waiting for the other criterion to be met.

7. The method according to claim 1, further comprising:
   detecting a position of a drive lever;
   determining a target drive value on the basis of the position of the drive lever in a first range of a trajectory of the drive lever as a value that is greater than the target drive value determined when the performance-oriented mode is selected; and
   when the consumption-oriented mode is selected, determining the target drive value on the basis of the position of the drive lever in a second range of the trajectory of the drive lever as a value that is smaller than the target drive value determined when the performance-oriented mode is selected.

8. The method according to claim 7, further comprising:
   determining the target drive value on the basis of the position of the drive lever along the trajectory of the drive lever as a product of a total rise and the position of the drive lever along the trajectory of the drive lever.

9. The method according to claim 8, whereby, when the consumption-oriented mode is selected, the determination of the target drive value comprises:
   determining the target drive value in an initial range of the trajectory of the drive lever as a product of an initial rise and the position of the drive lever, in an intermediate range of the trajectory of the drive lever as a product of an intermediate rise and the position of the drive lever, and in an end range of the trajectory of the drive lever as a product of an end rise and the position of the drive lever,
   whereby the total rise is different from the initial rise, from the end rise and from the intermediate rise.

10. A hybrid vehicle comprising:
   a drive system that has an internal combustion engine, whereby the drive system assists in a selection between a performance-oriented mode and a consumption-oriented mode,
   a first electric machine,
   a second electric machine,
   a battery, and
   a drive system control unit which is configured to:
   when the consumption-oriented mode is selected, in the case of a first condition, control the drive system in a parallel boost hybrid mode of operation in which the internal combustion engine and the first electric machine and/or the second electric machine deliver a drive torque until a criterion is met that depends on a duration of an operation of the parallel boost hybrid mode of operation and/or on an energy conversion in the parallel boost hybrid mode of operation, and if the criterion is met, change over to a serial hybrid mode of operation in which the drive torque is delivered by means of the second electric machine, and the internal combustion engine powers the first electric machine in order to generate electrical energy, when the performance-oriented mode is selected, in the case of the first condition, control the drive system in the serial hybrid mode of operation without waiting for the criterion to be met, whereby the first condition involves a driver increasing a target drive value to an intermediate value that is between:

a threshold for the internal combustion engine, representing a maximum drive value in a parallel hybrid mode of operation in which exclusively the internal combustion engine delivers a drive torque, and a threshold for the parallel hybrid mode of operation, representing a maximum drive value in the parallel boost hybrid mode of operation.

11. The method according to claim 5, whereby, when the target drive value is raised from a value above the threshold for the parallel hybrid mode of operation to a value below the threshold for the parallel hybrid mode of operation, the control of the drive system when the consumption-oriented mode is selected entails:

that a change be made from the serial hybrid mode of operation over to the parallel boost hybrid mode of operation without waiting for the other criterion to be met.

* * * * *